P. C. HAIRSTON.
Wheels for Vehicles.

No. 143,282. Patented September 30, 1873.

Witnesses.
Chas. Nida
C. Sedgwick

Inventor,
P. C. Hairston
Per
Attorneys,

UNITED STATES PATENT OFFICE.

PETER C. HAIRSTON, OF CRAWFORDSVILLE, MISSISSIPPI.

IMPROVEMENT IN WHEELS FOR VEHICLES.

Specification forming part of Letters Patent No. 143,282, dated September 30, 1873; application filed June 7, 1873.

Figure 1:
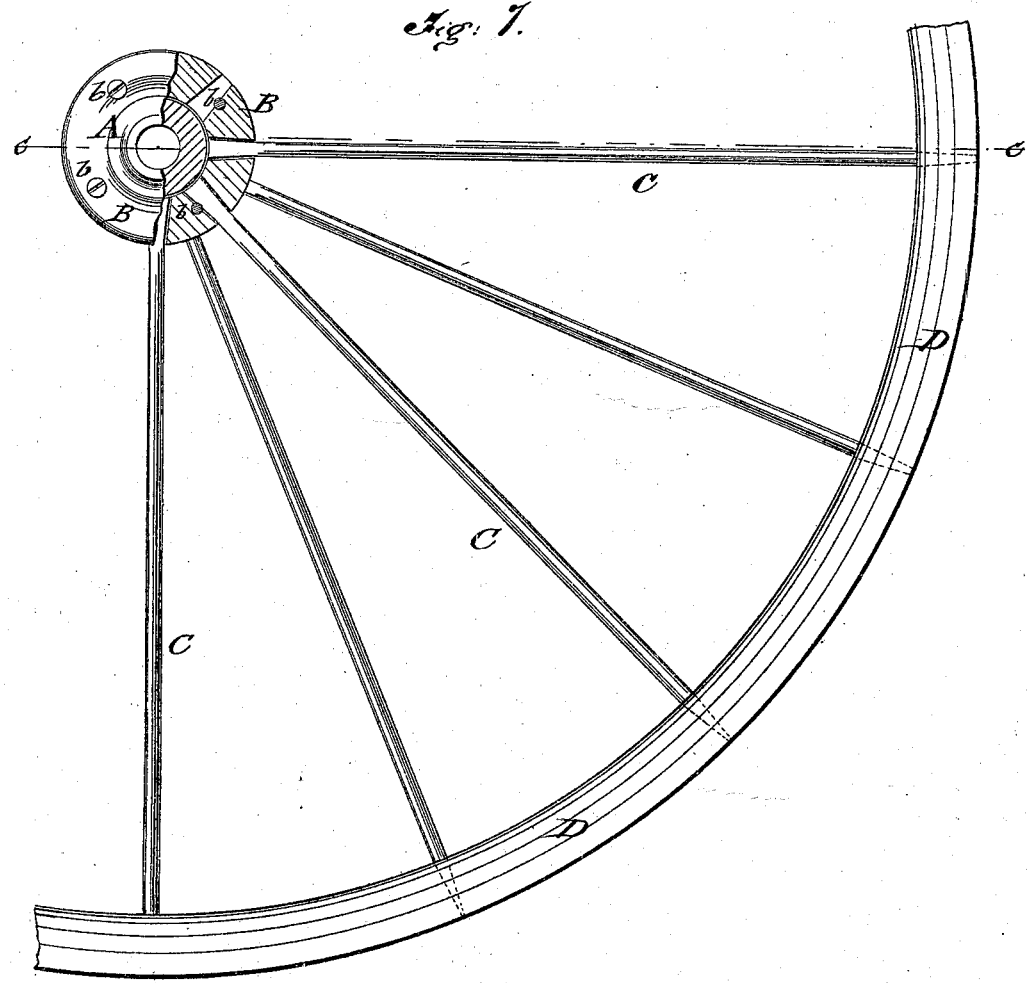
Figure 2:
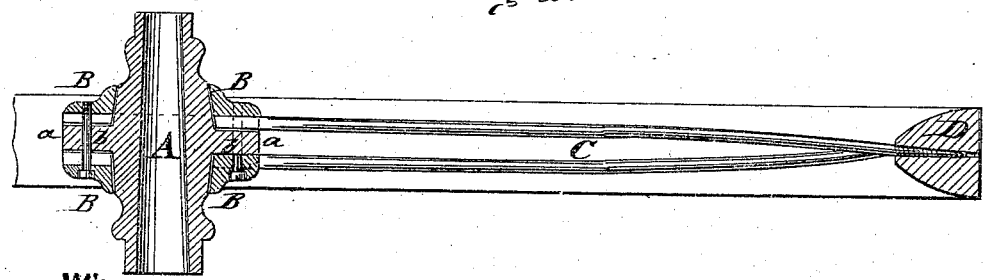

To all whom it may concern:

Be it known that I, PETER C. HAIRSTON, of Crawfordsville, in the county of Lowndes and State of Mississippi, have invented a new and Improved Wheel, of which the following is a specification:

In the accompanying drawing, Figure 1 is a side view of my improved wheel, partly in section; and Fig. 2, a horizontal section of the same on the line c c, Fig. 1.

Similar letters of reference indicate corresponding parts.

The object of my invention is to construct an improved metallic wheel for wagons, carriages, &c., which is simple and strong in construction, so that it can overcome any resistance that may occur, and last a longer period of time. My invention consists of a hub with projecting central piece and two detachable collars, into which the dovetailed ends of the spokes are mortised and held by lateral screw connections. The curved spokes bear against the tire, and are, with their conical outer ends, screwed therein.

In the drawing, A represents the hub of the wheel, of steel or other suitable metal, and therefore of lighter dimensions than the wooden hubs. A central projecting piece or rim, a, of hub A serves, in connection with the collars B, to hold the spokes C between them. The ring-shaped collars B are mortised on that side adjoining rim a for the dovetailed ends of the spokes, which may be formed, by preference, by enlargement of the ends of the spokes, so as not to recess and weaken them. Screws b pass laterally through both collars B and rim a, and bolt the collars and spokes firmly together. The spokes C are slightly curved, one half of them being mortised into the collar B at one side of the central rim b, the other half to the other collar B, alternately extending toward the tire and resisting any strain on them. Their outer ends are of conical shape, and are screwed into the tire under a slight angle toward the central axis of the same, following the curve of the spokes. The spokes C are first connected with the tire, and then with the collars of the hub, and are made a very little longer to be forced into position and receive, thereby, the curved shape, which gives elasticity to the wheel. The tire D is of heavier size, as it takes the place of the common fellies and tire, and is of slightly curved and tapering shape, as indicated in Fig. 2.

The whole wheel is intended to be made of metal, is light and pleasing in appearance, and can be made at nearly the same price as wooden wheels.

Having thus described my invention, what I claim as new, and desire to secure by Letters Patent, is—

1. The combination of hub A, collars B, screws b, spokes C, and tire D, forming the metallic wheel, substantially as and for the purpose described.

2. The combination, with the hub A, having central rim a, and the annular collars B, of the spokes C, provided with dovetailed inner ends, whereby they are secured, as shown and described.

PETER C. HAIRSTON.

Witnesses:
JOHN M. LEDBETTER,
R. SID. WITHERSPOON.